United States Patent Office 3,605,553
Patented Sept. 20, 1971

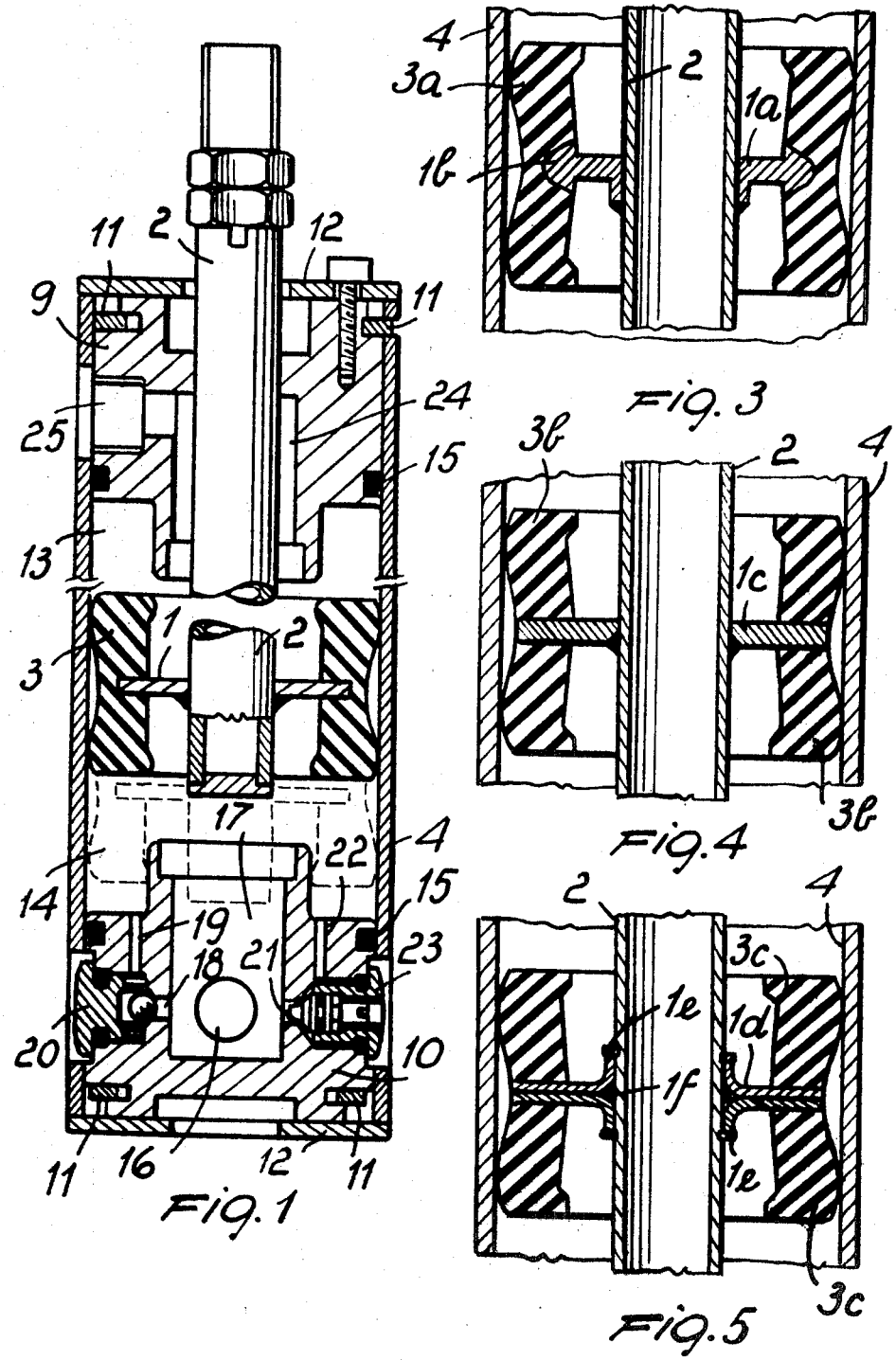

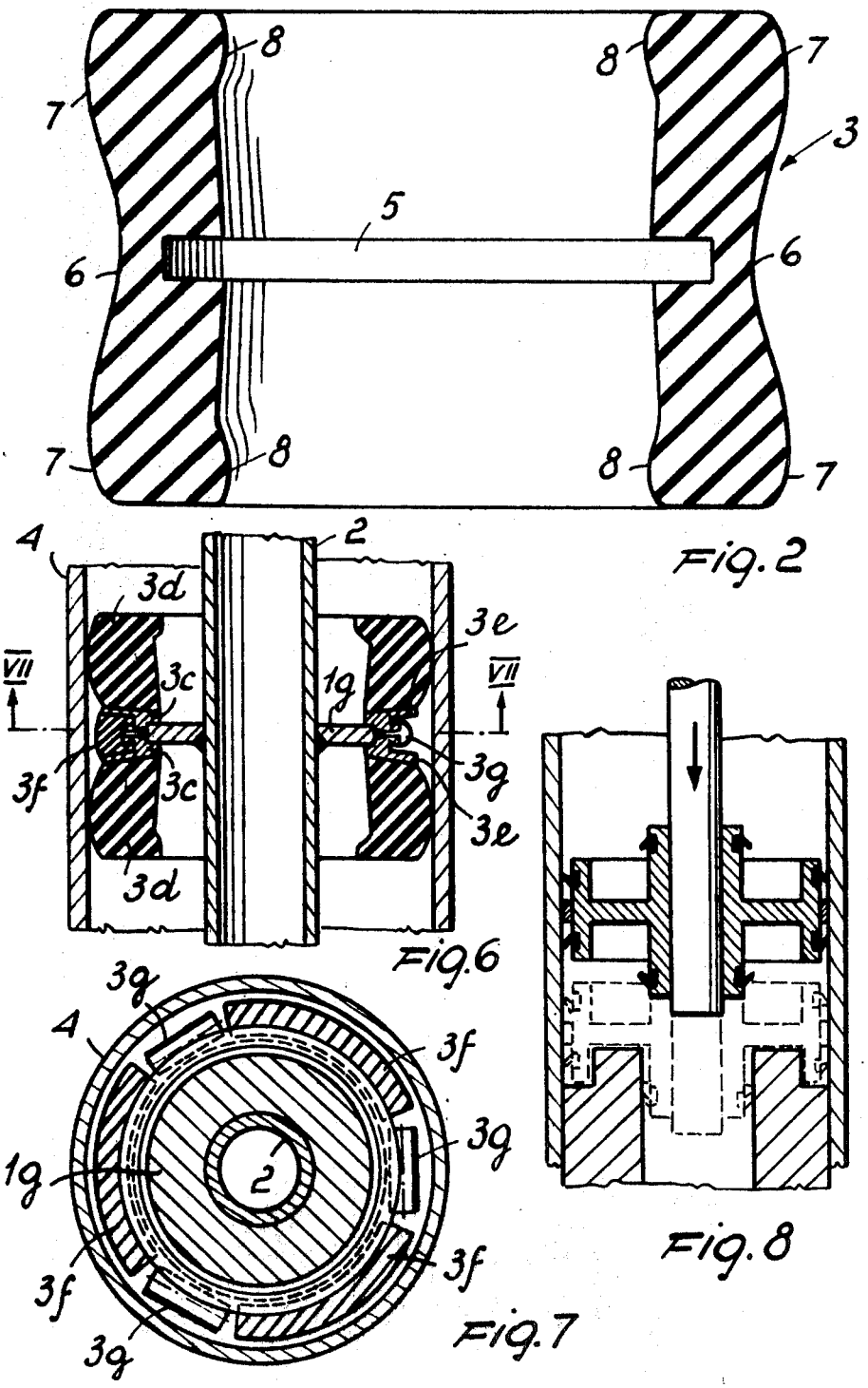

3,605,553
PRESSURE FLUID OPERATED CYLINDER
Pier Luigi Panigati, Via Cesare Battisti,
20042 Albiate Brianza, Milan, Italy
Filed May 5, 1969, Ser. No. 822,864
Int. Cl. F15b *15/22*
U.S. Cl. 91—26                     1 Claim

ABSTRACT OF THE DISCLOSURE

This disclosure relates to a piston for fluid dynamic cylinders which comprises a piston rod, a disc mounted on the piston rod and having a diameter less than the internal diameter of the cylinder in which said piston is arranged to slide, and a resilient sleeve mounted on said disc, the central portion of said resilient sleeve having a smaller diameter than the end portions thereof which engage the inner surface of said cylinder, said end portions of the resilient sleeve being arranged to enter annular seats provided in the ends of said cylinder in the stroke end positions of said piston.

BACKGROUND OF THE INVENTION

The present invention relates to a piston for fluid dynamic cylinders which is of improved structure.

The main object of the present invention is that of providing a piston for fluid dynamic cylinders which is designed to simultaneously form a seal with the cylinder liner and guide the stem-piston unit, while in the stroke end arrangement there is provided the formation of a damping chamber.

Another object of the invention is that of providing a piston which enables a considerable reduction in the production cost of fluid dynamic cylinders.

Another object of the invention is that of providing a piston for fluid dynamic cylinders which is designed to eliminate the harmful spaces which form in the damping chamber produced by conventional methods.

Another object of the invention is that of providing a piston which gives rise to an efficient damping of the oscillations to which the piston is subject in the stroke end phase.

A further object of the invention is that of providing a piston which does not cause scraper-oil effects as in the known types, but instead guarantees the formation of a suitable lubricating film on the internal surface of the cylindrical chamber.

SUMMARY OF THE INVENTION

According to the invention there is provided a piston for fluid dynamic cylinders which comprises a piston rod, a disc mounted on said rod, said disc having a diameter less than the internal diameter of a cylinder in which said piston is arranged to slide, a resilient sleeve member mounted on said disc, said resilient sleeve being arranged to project on at least one side of said disc in a direction substantially perpendicular to said rod, the end portions of said resilient sleeve being arranged to engage the internal wall of said cylinder, said resilient sleeve having a narrowed portion between said end portions which does not engage the internal wall of said cylinder, at least one of said end portions of said resilient sleeve being arranged to penetrate on at least one side of said disc into an annular seat provided adjacent the end of said cylinder to form a damping chamber.

BRIEF DESCRIPTION OF THE DRAWINGS

The invention will appear more clearly from the following detailed description of some preferred embodiments of a piston according to the invention, illustrated by way of example in the accompanying drawing in which:

FIG. 1 is a longitudinal axial section of a fluid dynamic cylinder provided with a piston according to the invention;

FIG. 2 shows, to an enlarged scale, a detail of the piston according to the invention seen in axial section;

FIGS. 3, 4, 5 and 6 show, in axial section, further embodiments of the piston according to the invention;

FIG. 7 is a cross-section taken along the line VII—VII of FIG. 6;

FIG. 8 is a diagrammatic section of a part of a cylinder of conventional type.

DESCRIPTION OF THE PREFERRED EMBODIMENT

With reference to FIGS. 1 and 2, the piston according to the embodiment comprises a metal disc 1 which is secured, for example by welding, to the stem or rod 2 of a fluid dynamic cylinder, and a sleeve 3 of resilient or elastomeric material, for example rubber, to be fitted to said disc 1. Said disc 1 has a diameter somewhat less than the internal diameter of the cylindrical cylinder liner or inner wall 4. The resilient sleeve 3 projects laterally on one and/or the other side of the disc 1 and is substantially cylindrical with a central transverse groove 5 (FIG. 2) inside which the peripheral edge of the disc 1 may be inserted.

As is clearly shown in FIG. 2, the sleeve 3 has a saddle like periphery with a central narrowed portion 6 which is of convex shape and widened end portions 7 of convex shape. The ends of the narrowed portion 6 are internally provided with widened convex portions or rounded annular ribs 8 which join up.

The sleeve 3 is mounted on the disc 1 by simply sheathing it on to the latter so that the peripheral edge of said disc 1 is inserted in the transverse groove 5 of said sleeve. The widened end portions 7 of the sleeve 3 thus engage, after mounting, the internal surface of a cylindrical cylinder liner 4 in two annular zones which bound an intermediate narrow zone corresponding to the narrowed sleeve portions 6.

Two closing head or end members 9 and 10 of the cylinder are inserted in the ends of the cylinder and are locked there by means of resilient metal rings 11 having peripheral projections which are inserted in respective slots provided on the cylindrical skirt. The fixing of the end members 9 and 10 may however be carried out in any other suitable way.

Cap members 12 are then fitted on to the end members 9 and 10.

Both the end members 9 and 10 are provided, at the face or portions facing the piston, with annular narrowings or recesses 13 and 14 arranged adjacent the cylinder liner 4. Said narrowings 13 and 14 form seats for housing the ends or annular end formations of the sleeve 3. When the ends of said sleeve 3 penetrate into the seats 13 and 14 they bound compression spaces or damping chambers designed to exercise an efficient damping action during the stroke end phase of the piston.

The end members 9 and 10 of the cylinder are provided with gaskets 15 which are interposed between the end members and the cylinder liner 4.

The end member 10 has a feed or discharge hole or port 16 which communicates with a cylindrical cavity 17 provided on the end member 10. The cavity 17 then communicates with the seat 14 through pipes 18 and 19 which are controlled by an adjustment valve, for example of the needle valve type.

When the working fluid is passed in through the opening 16 it passes into the cylindrical chamber through the cavity 17 and the pipes 18 and 19, a nonreturn valve provided therein allowing the flow of fluid towards the cylindrical chamber.

When the piston reaches the end member 10 in the stroke end position, the sleeve 3 penetrates into the seat 14 (as indicated with dotted lines in FIG. 1) and the fluid contained in the seat 14 is consequently compressed and determines a damping action since the passage of the fluid along the pipes 19 and 18 is impeded by the nonreturn valve 20 while the passage through pipes 22 and 21 is throttled by an adjustment valve 23.

The other end member 9 is formed similarly to the end member 10 and comprises a cavity 24 (FIG. 1) through which the piston rod 2 passes and which communicates with a feed or discharge hole 25. In the illustrated embodiment adjustment members and nonreturn valves are not shown in the end member 9 since the planes of section of the end members 9 and 10 are at 90° to one another.

When the portions 7 and 8 of the elastic sleeve 3 are inserted in the seat 14, the fluid below the disc 1 (with reference to the position shown in dotted lines in FIG. 1) goes directly to the discharge 16, while the fluid contained in the seat 14 can pass towards the discharge 16 only through the pipes 21 and 22 controlled by the adjustment valve 23. Said adjustment valve 23 can completely stop the passage of the fluid or permit the passage of a small quantity thereof according to the adjustment.

The particular form of the resilient sleeve 3 avoids scraping-oil effects which normally occur with the usual lip gaskets. On the contrary the expansion profile 7 and the reduced section portion 6 guarantee the formation of a lubricating film on the internal surface of the cylindrical cylinder liner 4. This is particularly advantageous since it ensures better working and less frictional heating than the known types.

The resilient sleeve 3 also performs an efficient damping of the oscillations which the piston undergoes in the stroke end phase. This is made possible by engagement, which is variable within wide limits, which can be provided between the sleeve 3 and the cylindrical liner 4, relative to the portions 7, and between said sleeve and the inwardly projecting portion of the end member, relatively to the portions 8. Such engagement, which increases with the pressure as the volume of the damping chamber is reduced, limits the amplitude and the frequency of the oscillations.

The lateral projection of the sleeve 3 with respect to the disc 1 can be increased on one or both sides to the point of rendering its length greater than the depth of the seats 13 and 14 so as to absorb, with the elastic deformation of the rubber or the like, part of kinetic energy of the moving mass.

It should be pointed out that in the known types of fluid dynamic cylinder the damping effect is obtained by means of two gaskets arranged at the two ends of the piston, such gaskets being designed to guarantee the seal in the cavity of the end member in which said piston penetrates in the stroke end phase, as illustrated in FIG. 8. This causes the formation of a harmful space since the advance of the piston towards the stroke end position, while causing a reduction in the volume of the damping chamber, causes a slight increase in the volume bounded by the gasket (in movement), the end of the piston and the relative cavity of the end member.

With the piston according to the embodiment such drawback is practically eliminated since the seal between the end of the piston rod 2 and the cavity 17 is not necessary due to the seal effect exercised directly by the resilient sleeve 3.

FIGS. 3 to 7 show other embodiments of the piston according to the invention.

In FIG. 3 the disc 1a has a substantially head section with the edge 1b designed to penetrate into a corresponding groove provided in the resilient sleeve 3a.

In FIG. 4 the disc 1c has a greater external diameter than the disc 1, while the sleeve 3 is replaced by two identical and symmetric portions 3b which are suitably vulcanized or glued on to the disc 1c. According to a modification, the parts of the symmetric sleeve portions 3b which are subject to wear may be readily replaced.

In FIG. 5 there are provided portion 3c similar to the portions 3b described above, vulcanized or glued on the two discs 1d which are mounted on the piston rod 2 and secured with resilient metal rings 1e with the interposition of a gasket 1f.

In the embodiment of FIGS. 6 and 7, the piston comprises two symmetric and equal portions 3d vulcanized or glued to metal annular members 3e which engage the edge of the disc 1g and are secured together by means of segments 3f alternate with resilient members having a C-shaped cross-section.

As may be noted, the piston according to the invention can be produced in very rapid and economic manner, since the metal disc to be secured to the piston rod 2 has rather large tolerances; in fact, the seal is ensured in complete manner by the resilient sleeve.

Numerous modifications and variations are possible within the scope of the appended claim. For example, the cylinder may be single or double acting.

I claim:

1. A pressure fluid operated cylinder with ports for the pressure fluid and including therein at least one end thereof a closing head member, a piston having a piston rod, said piston being comprised of a disc member having a diameter less than the internal diameter of said cylinder, a resilient sleeve member mounted on said disc and having a peripheral surface slidably engaging at least with one portion thereof the internal wall of said cylinder, said internal wall having a lubricating film thereon, said peripheral suurface having a radially narrowed intermediate portion spaced from said internal wall and wherein, according to the improvement, said closing head member has a face facing said piston and a peripheral annular recess in said face, and said resilient sleeve member having an annular end formation projecting from said disc in a direction substantially perpendicular thereto on at least one side thereof and facing said annular recess, the size of said annular end formation corresponding to the size of said annular recess thereby allowing said annular end formation snugly to penetrate into said annular recess and to form therewith and with the corresponding inner wall portion a damping chamber for the piston and wherein at least said annular end formation of said resilient member is made of elastomeric material and wherein the periphery of said resilient member has a saddle-like shape with edges having a convex shape thereby to form with the adjacent portion of said inner wall an annular funnel-like configuration at said edges to allow said resilient member to slide over said lubricating film and to prevent scraping thereof, said annular end formation having a rounded annular rib at an inner diameter edge thereof adapted to engage the inner diameter wall of said annular recess, at least one of said head members having ducts opening into said annular recess and communicating with one of said ports, adjustable valve means in one of said ducts for adjusting the dampening effect of said annular recess and nonreturn valve means in the other of said ducts for preventing the flow of working fluid from said annular recess through said other ducts and allowing the flow of working fluid therethrough towards said annular recess, said resilient sleeve member having an internal annular groove arranged to receive the peripheral edge of said disc.

References Cited

UNITED STATES PATENTS

| | | | |
|---|---|---|---|
| 1,532,205 | 4/1925 | Slater | 92—250X |
| 2,984,529 | 5/1961 | Dailey | 92—85X |
| 3,150,747 | 9/1964 | Bliven et al. | 188—88(BA) |
| 3,176,595 | 4/1965 | Schwartz | 92—249X |
| 2,897,785 | 8/1959 | Ortman | 91—26 |
| 3,027,877 | 4/1962 | Lansky | 91—394X |

FOREIGN PATENTS

| | | | |
|---|---|---|---|
| 599,427 | 6/1960 | Canada | 188—100 |
| 496,688 | 10/1928 | Germany | 188—88(BA) |

GEORGE A. HALVOSA, Primary Examiner

U.S. Cl X.R.

91—394; 92—85, 249; 188—284, 322